Figure 1:
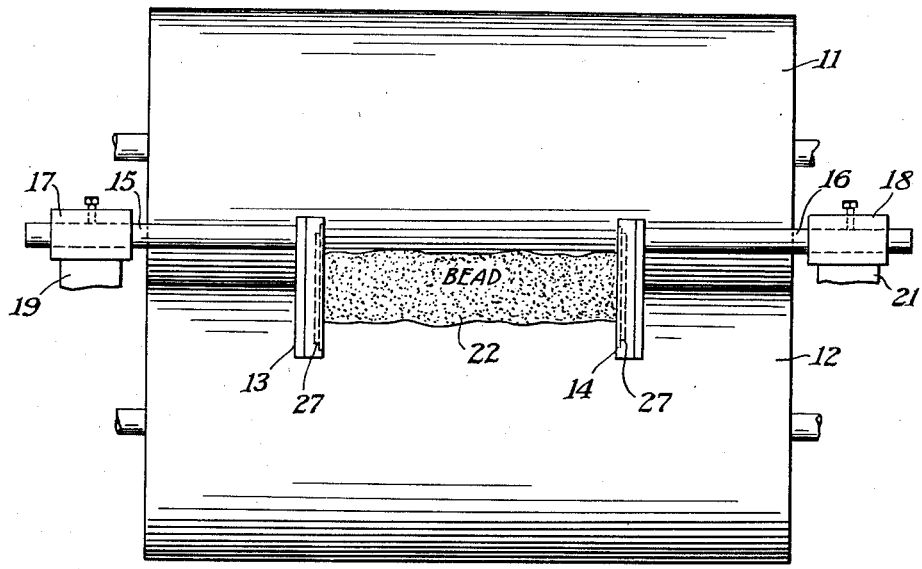

Dec. 19, 1950         M. E. PIKE ET AL         2,534,296
APPARATUS FOR CALENDERING THERMOPLASTIC SHEETS
Filed Dec. 30, 1947

MERLE E. PIKE
EVERETT LANE
INVENTORS

BY *H. M. Perrins*
*Daniel I. Mayne*
ATTORNEYS

Patented Dec. 19, 1950

2,534,296

UNITED STATES PATENT OFFICE 2,534,296

APPARATUS FOR CALENDERING THERMO-PLASTIC SHEETS

Merle E. Pike, Kingsport, Tenn., and Everett W. Lane, Gates City, Va., assignors to Eastman Kodak Company, Rochester, N. Y., a corporation of New Jersey Application December 30, 1947, Serial No. 794,582

3 Claims. (Cl. 18—2)

This invention relates to apparatus adapted to continuously calender thermoplastic sheeting, and more particularly to improved calendering apparatus for controlling the width of the sheet being calendered.

Various types of calendering apparatus have been employed heretofore to roll out continuous thermoplastic sheets or webs into a product sheet of predetermined thickness. In these apparatuses the calender rolls are often much wider than the rough sheet being calendered and as the sheet passed through successive calenders it gradually increases in width across the width of the calender rolls. The successive rolls are normally operated at faster rates to take up the longitudinal gain in length of the continuous sheet as it is rolled thinner and thinner. However, little regard has been given to the gain in the width of the sheet since the width has been regulated by employing a pair of edge trimmers which cut off the parallel edges of the continuous sheet before it is rolled up into a final packaging roll. Thus it is often the case that a greater amount of thermoplastic material is processed than is required for the production of the resulting sheet.

An object of the present invention is, therefore, an improved thermoplastic sheet calendering apparatus by which the width of the thermoplastic being formed and calendered is more exactly controlled.

Another object of the invention is an improved calendering apparatus which can be adjusted to produce and/or calender continuous sheets of thermoplastic material of predetermined width.

Another object is calendering apparatus for producing continuous plastic sheets of a variety of predetermined widths.

Still another object is calendering apparatus for continuously producing thermoplastic sheeting of controlled thickness and width. Other objects will appear hereinafter.

In accordance with the invention these and other objects are attained by providing a pair of calendering rolls having a pair of adjustable plates associated therewith which may be moved back and forth in a plane parallel with the rolls to determine the width of the mass of plastic material being fed through the nip of the rolls. The plates have arcuate sections which fit closely to the surfaces of the rolls and prevent plastic from flowing sidewise under the plates. The plastic, therefore, is restricted in width at the bite of the rolls to the distance between the plates and the resulting calendered sheet will have a width within predetermined limits.

In accordance with another feature of the invention the plates which adjustably control the width of the plastic mass being calendered may be internally heated so that if hot plastic is being calendered the plastic at the extremes of the mass will not be chilled below the optimum temperature and hence mal-formed by the calender.

In accordance with still another feature, the adjustable heated plates are surrounded at their peripheries with a heat insulating strip so that the adjacent rolls cannot be heated locally by the heated plates.

Figure 3:
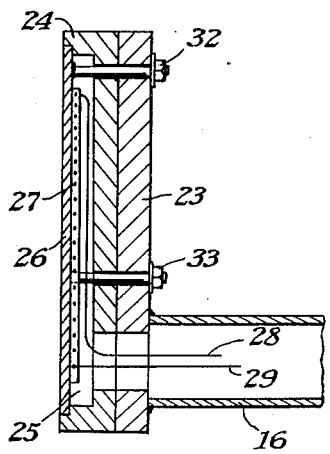
Figure 2:
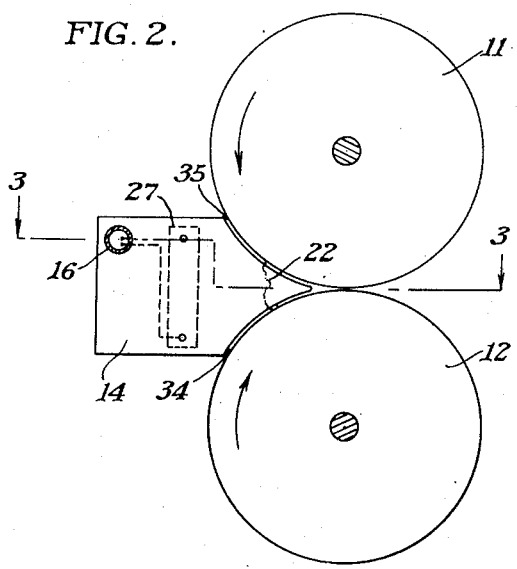

The invention will be more clearly understood from the following detailed description with reference to the attached drawings, in which:

Fig. 1 is a diagrammatic plan view of the calender rolls showing the adjustable plates for defining the width of the plastic mass passing through the calender rolls, Fig. 2 is an end elevational view of the apparatus particularly showing the arcuate sections of one of the adjustable plates, and Fig. 3 is an enlarged sectional view of the plate on line 3—3 of Fig. 2 particularly showing the position of the plate heater and general structure of the plates.

Referring to Fig. 1 there is shown a calender apparatus comprising a pair of co-acting parallel positioned and closely spaced vertically mounted rolls 11 and 12. As will be understood, these rolls are rotatable in opposite directions, as shown by the arrows of Fig. 2, by a motive force not shown and are suitably mounted on supporting members not shown. The rolls may be internally heated or cooled in any suitable manner as by introducing steam or hot or cold liquids into the interior of the rolls through their shafts as is understood in the art. The spacing between the rolls may be determined by means, not shown, for adjusting the position of one roll to the other. The description thus far describes a typical calender apparatus useful for calendering thermoplastic materials and forming a continuous sheet therefrom.

The present invention lies in the cooperation of such calender rolls with a pair of adjustable plates for restricting the width of the plastic passing through the rolls. These plates 13 and 14 are mounted on respective rods 15 and 16 which are respectively retained in adjustable position by collars 17 and 18 which are attached to the frame work of the apparatus, not shown, by respective members 19 and 21. As shown in Fig. 1 the plates 13 and 14 are positioned equidistantly from the ends of the rolls and a bead 22 of thermoplastic material is shown at the bite of the rolls and limited in width by plates 13 and 14. As the rolls revolve a sheet of plastic material issues from the opposite side of the rolls of a predetermined thickness and of a width approximately that of the distance between plates 13 and 14. To prevent the bead of plastic if it is heated at a desired temperature from cooling at the surface of the adjustable plates, the plates are heated. To prevent the heated plates from causing localized heating of the surface of the calender roll the plates and heaters are recessed into a heat insulating material such as fiber board. Other insulating materials such as asbestos boards, etc., may be employed.

The composite structure of the plates 13 and 14 is more clearly shown in Fig. 3. As shown in this drawing the plates comprise a supporting plate 23 having superimposed thereon, a fiberboard plate 24 having a recessed middle portion 25. The recessed portion of plate 24 is enclosed by a metal plate 26 against which the plastic mass is confined when the apparatus is in operation. Bolts 32 and 33 hold the plate components together. Attached to the back of this metal plate 26 is an electric heater 27 having wires 28 and 29 attached thereto which are connected to a source of electrical energy not shown.

The arcuate portions of the plates are shown more clearly in Fig. 2 as at 34 and 35. The plates are positioned so closely to the surface of the rolls that substantially no plastic flows underneath the two plates but is retained in the space between them.

It will be understood that other heating means such as infra-red lamps or steam could be employed in place of the electric heater to heat the plates, however, the electric heating unit appears desirable in most cases.

In the drawing the calender rolls are in a vertical relationship and in this position are adapted particularly to calendering previously formed continuous sheets into more perfect surfaced sheets of predetermined dimensions. The sheet to be calendered is continuously fed to the nip of the rolls and permitted to form a bead 22 of the plastic. This plastic bead 22 is confined between plates 13 and 14 as above described and hence the sheet issuing from the other side of the rolls is proportionate in width to the width of the bead 22. In some instances the preformed sheet being calendered is heated to a high temperature above that of the room so that when it comes into contact, as in the bead, with the plates 13 and 14 the edges of the bead cool below the optimum calendering temperature. In such cases, the electric heaters 27 are energized and the temperature of the plates 13 and 14 raised to approximate that of the plastic bead.

If desired, however, the rolls can be arranged in a horizontal plane, as though Fig. 1 was a plan view of the apparatus of the invention. In such an event, the continuous sheet to be calendered would be fed in a more or less vertical way to the nip of the rolls. The horizontal roll arrangement would permit sheets to be formed from comminuted plastic compositions which could be added to the space between the plates 13 and 14 from a hopper positioned thereabove.

The apparatus of the instant invention is adaptable to calender plasticized thermoplastic compositions or sheets made therefrom containing cellulose organic acid esters such as cellulose acetate, cellulose propionate, cellulose butyrate, cellulose acetate propionate, cellulose acetate butyrate; as well as compositions containing methyl ether, ethyl ether, benzyl ether and the like, as well as the thermoplastic resins such as acetal resins and others known to the art.

If the apparatus is employed to calender a preformed continuous sheet, as described above, the sheet may be formed by continuous extrusion through a die as shown for example in Kimble et al. Patents 2,151,476 of March 21, 1939; 2,177,658 and 2,177,660 of October 31, 1939; Conklin Patents 2,262,989 of November 18, 1941; 2,304,886 of December 15, 1942. The feed strip for the apparatus of the present invention may also be formed by the continuous rolling method shown in Conklin Patent 2,319,040 of May 11, 1943. Instead of supplying the strip to the pelleting device the strip could be conducted to the above described calender rolls to form the bead 22 as shown in Fig. 1 of the instant drawings. In this event the strip forming the bead 22 will have a temperature of 250–275° F. and it is therefore desirable that the plates 13 and 14 be heated to about 250° F. so that the bead of plastic will not become too cool at its end portions. The calender rolls 11 and 12 generally may be operated when calendering cellulose ester sheets at a temperature from 150 to 250° F. depending on the amount of plasticizer present in the composition. The present apparatus is well suited to calender the sheets made from the various compositions disclosed in the above mentioned patents.

Because the plates 13 and 14 restrict the bead 22 to a definite length the resulting calendered sheet has a width within predetermined limits and, therefore, if the edges are trimmed by parallel edge trimmers less waste is produced. By making the space between the plates 13 and 14 greater or smaller, one pair of calender rolls is easily adapted to calender accurately sheets of a great variety of widths.

We claim:

1. In apparatus for continuously calendering plastic compositions into continuous sheeting comprising a pair of heated, parallel-positioned closely-spaced rolls, said rolls adapted to be rotated in opposite directions, a pair of horizontally adjustable plates positioned adjacent the bite of the rolls and adapted to confine the plastic composition about to be calendered between the plates along the bite of the rolls, and heating means within the respective plates adapted to maintain the temperature of the plates at substantially the temperature of the rolls whereby defects in the sheeting due to cooling at the edges of the plastic composition being confined between the plates are prevented.

2. In apparatus for continuously calendering plastic compositions into continuous sheeting comprising a pair of heated, parallel-positioned closely-spaced rolls, said rolls adapted to be rotated in opposite directions, a pair of horizontally adjustable plates positioned adjacent the bite of the rolls adapted to confine the plastic compositions about to be calendered between the plates along the horizontal axes of the rolls, heating means within the respective plates adapted to maintain the temperature of the plates at substantially the temperature of the rolls whereby defects in the sheeting due to cooling at the edges of the plastic composition being confined between the plates are prevented, and insulating means associated with the plates and extending from the plates toward the rolls adapted to prevent localized heating of adjacent roll surfaces.

3. In apparatus for continuously calendering plastic compositions into continuous sheeting comprising a pair of heated, parallel-positioned, closely-spaced rolls, said rolls adapted to be rotated in opposite directions, a pair of horizontally adjustable plates positioned adjacent the bite of the rolls and having arcuate sections fitted closely to the adjacent peripheral surfaces of the rolls adapted to confine the plastic compositions about to be calendered between the plates along the horizontal axes of the rolls, heating means within the respective plates adapted to maintain the temperature of the plates at substantially the temperature of the rolls whereby defects in the sheeting due to cooling at the edges of the plastic composition being confined between the plates are prevented and insulating means associated with the plates and extending from the plates toward the rolls adapted to prevent localized heating of adjacent roll surfaces.

MERLE E. PIKE.
EVERETT W. LANE.

REFERENCES CITED

The following references are of record in the file of this patent:

UNITED STATES PATENTS

| Number | Name | Date |
|---|---|---|
| 1,664,273 | Theroux | Mar. 27, 1928 |